Feb. 16, 1932.        W. G. GOLDSMITH        1,845,657
FERRO CONCRETE CONSTRUCTION
Filed April 9, 1929
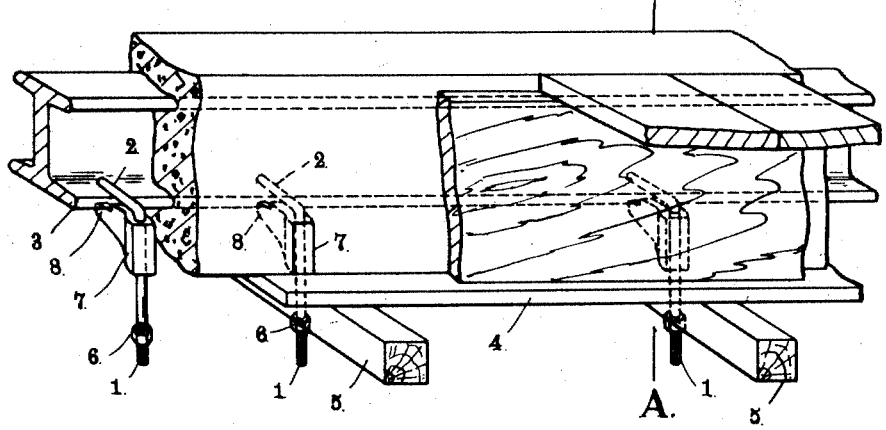
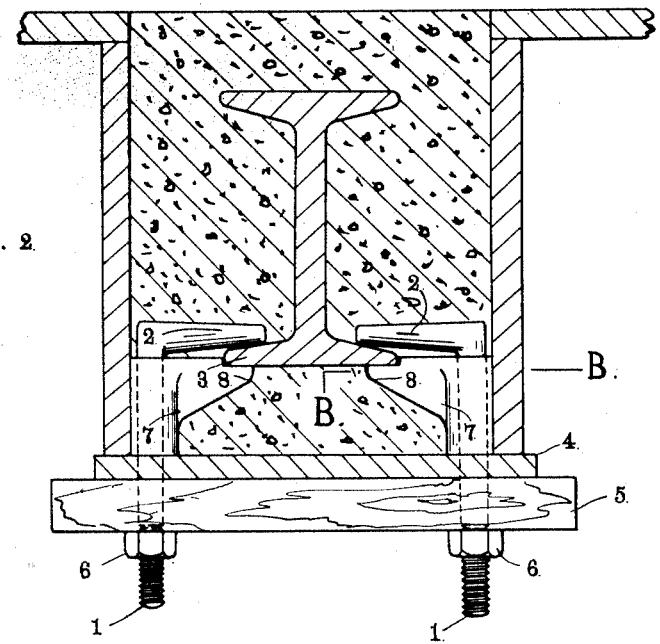
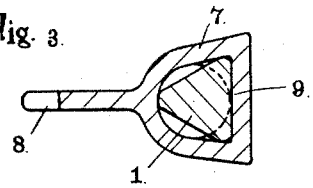
INVENTOR,
W. G. Goldsmith
By his Attorney.

Patented Feb. 16, 1932

1,845,657

UNITED STATES PATENT OFFICE

WILLIAM GEORGE GOLDSMITH, OF BANKSTOWN, SYDNEY, NEW SOUTH WALES, AUSTRALIA

FERRO CONCRETE CONSTRUCTION

Application filed April 9, 1929, Serial No. 353,723, and in Australia June 20, 1928.

The invention relates to boxing employed in ferro-concrete construction.

According to my invention the boxing for a beam or the like to be embedded in concrete is supported from the beam by suspension bolts which because of their peculiar construction are readily removable after the concrete has become set.

An extension at right angles from the suspension bolt, the end of which rests upon the beam, is made tapering to facilitate its withdrawal from the concrete and for the same purpose the upper end of the bolt is wedge shaped in section.

A wedge shaped bracket sleeved upon the suspension bolt and having a notched end which fits upon the flange of the beam maintains the suspension bolt in vertical position while the boxing and framing are being clamped together and serves as a distance piece between the flange of the beam and the bottom board of the boxing whereby the thickness of concrete below the beam is determined.

The invention is illustrated in the accompanying drawings, wherein:—

Fig. 1 is a side perspective elevation.
Fig. 2, a cross section on A A Fig. 1 and Fig. 3, a sectional plan on B B Fig. 2.

Similar parts are indicated by the same reference numerals throughout the figures.

The suspension bolt 1 has the cylindrical tapering extension 2 which is approximately at right angles to the bolt and bears at its end upon the flange 3 of the beam.

The suspension bolt passes through a hole in the bottom board 4 of the concrete mould box, through a cross batten 5 and upon its end has a clamping nut 6.

The upper part of the bolt is wedge shaped in cross section and rounded at the angles as shown in Fig. 3.

An independent wedge shaped spacing bracket 7 sleeved upon the suspension bolt is notched at its outer end 8 to fit upon the flange of the beam.

The hole through the bracket is formed to approximately correspond with the sectional shape of the upper part of the suspension bolt upon which it is sleeved, the hole having a flat side 9 which prevents the spacing bracket from turning around on the bolt.

The spacing bracket determines the spaces between the edge of the flange of the beam and the side of the mould box, and also between the underside of the beam and the bottom board 4 of the mould box.

The spacing bracket being merely sleeved upon and removable by being slid off, the suspension bolt may be readily replaced by another similar bracket of different dimensions when it is required to encase the beam in concrete of other thickness.

Upon occasions when the spacing bracket is not employed the wedge shape of the bolt in cross section is important to facilitate its withdrawal from the concrete.

I claim:—

1. For the purpose indicated in combination a suspension bolt having at its upper end a cylindrical tapering extension and a sided portion below the extension and a spacing bracket having a hole therethrough corresponding to the shape of said sided portion and adapted to be sleeved thereon, as specified.

2. For the purpose indicated a spacing bracket having a sided hole adapted to fit upon a similarly shaped portion of a suspension bolt and having a notched end adapted to fit upon the flange of a beam, as specified.

In testimony whereof I have signed my name to this specification.

WILLIAM GEORGE GOLDSMITH.